United States Patent Office.

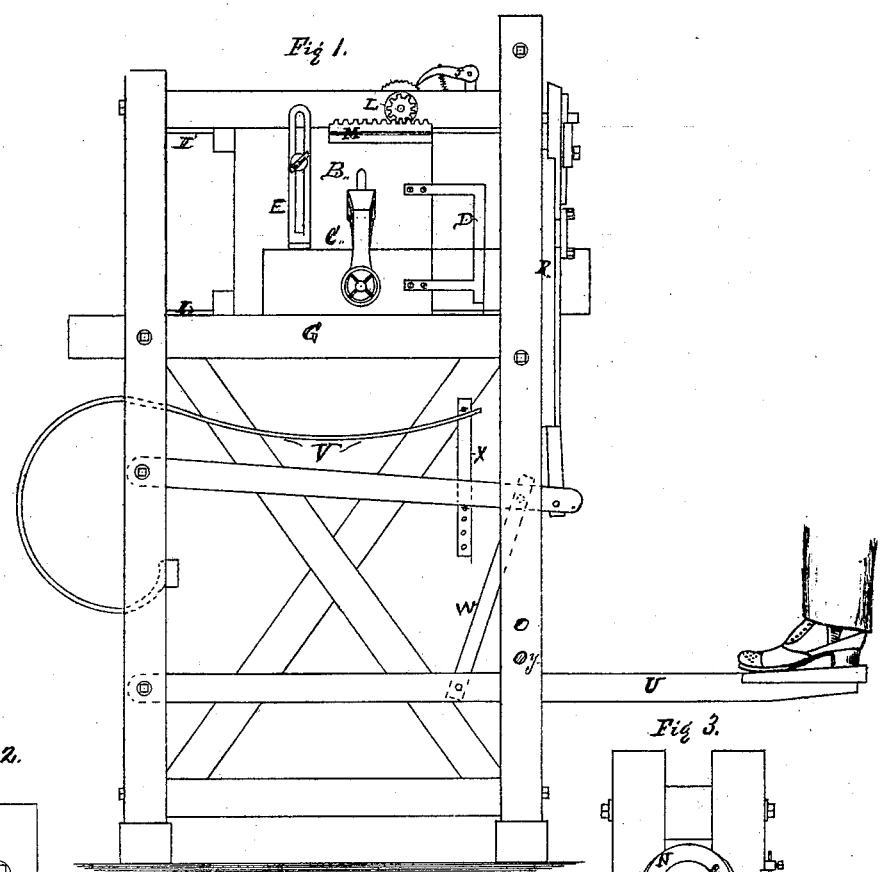
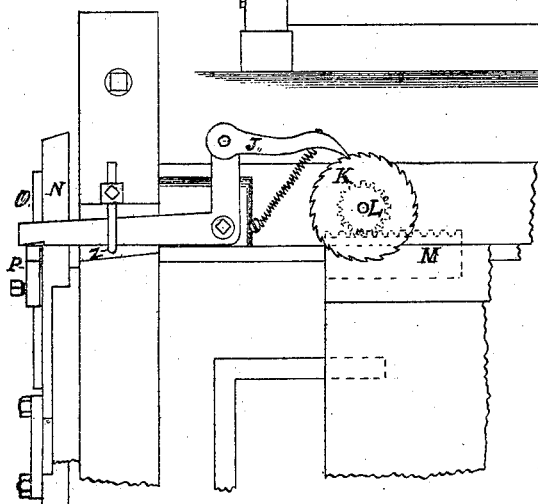
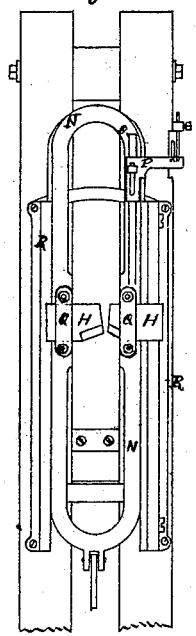
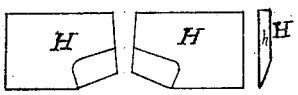

WILLIAM GILMORE, OF HUDSON, NEW JERSEY, ASSIGNOR TO HIMSELF AND HENRY M. ROGERS, OF SAME PLACE.

Letters Patent No. 113,873, dated April 18, 1871.

IMPROVEMENT IN TENON-MACHINES.

The Schedule referred to in these Letters Patent and making part of the same.

*To whom it may concern:*

Be it known that I, WILLIAM GILMORE, of Hudson, in the county of Hudson and State of New Jersey, have invented certain new and useful Improvements in Tenoning-Machines; and I do hereby declare the following to be a full and exact description of the same, reference being had to the drawing that accompanies and forms a part of this specification, in which—

Figure 1 is a side elevation of the machine in full operation.

Figure 2 is an enlarged view of the pawl-arm and ratchet-wheel.

Figure 3 is an enlarged view of the face or front end.

Figure 4 is an enlarged view of the knives or cutters, detached.

My invention consists in improving the machine which I patented the 24th day of November, 1868.

The nature of this as well as that invention relates to machines for forming tenons on and for wood framing, and consists in the arrangement of a sliding clamping-carriage, B, having an adjustable clamp, C, gauge D. By referring to fig. 1 the object of this carriage will be seen.

The clamp C holds the material on or out of which the tenon is to be made or formed, the drop E assisting the clamp by keeping the material down on the table G.

The use of the gauge D is hereinafter delineated.

As it will be seen, the whole duty of this carriage is to advance or push forward to the cutters H H the material out of which the tenon is to be cut, and hold or keep the said material in its proper position.

Now, in order for this carriage to move the board or plank, or whatever it may be, forward, there must be some power to move it, (the carriage.) I have chosen a sliding or railroad motion; the carriage sliding or running on ways I I, provided for that purpose.

We will now examine fig. 2, which gives us a full view of the mechanism which moves the carriage, (of course it being understood that all our power comes from the treadle, see fig. 1.)

The pawl and pawl-arm J moves the ratchet-wheel K one or two (according to how it is set or regulated) teeth backward every time the cutters go up.

The ratchet-wheel being on the same shaft as the pinion L they must turn together; the cogs of the pinion going backward move the rack M forward, this rack being attached to the upper part of the carriage; thus we get the required motion.

On the sliding or cutting-frame N there is a small way or guide, O, on which I screw an adjustable wiper, P. (See fig. 3.)

This form and shape of the elongated sliding frame I deem quite necessary: first, because it is strong; second, it is light; third, it is not liable to get out of shape or order; fourth, it is easily molded and finished; and fifth, because it is inexpensive.

In this frame I make two grooves, in which the cutters H H are set. Over them I fasten straps or clamps Q Q by means of screws.

This sliding frame runs up and down in suitable guides or ways R.

To prevent the frame N from shaking or wearing loose I fix a gib, S, with set-screws T T, in the usual way.

U is a treadle, by which the cutter-gate or sliding frame is brought or moved downward against the action of the spring V.

The spring raises the cutter-gate and keeps it in an elevated position, when the pressure of the foot is taken off the treadle.

Every time the sliding frame rises the wiper P strikes the pawl-arm J, causing the movements already mentioned.

By referring to fig. 1, the arrangement of the spring V, treadle U, and links W and X may be plainly seen.

The pin Y prevents the treadle rising too high.

I do not confine myself to any particular style or kind of gearing under the table G, but I believe a treadle and spring to be absolutely necessary.

Most of the gearing I believe should be made of iron or some similar metal, while the frame A may be made of wood bolted together, as shown in the drawing; or, if desired, could be cast-iron.

It is usual to saw the tenons, when making them, by hand, so as to roughen the sides, that the glue or cement may have a better hold upon them; the peculiar shape of my knives or cutters do all this. (For shape of cutters see fig. 4.) But to describe my machine more explicitly I will show how to operate it.

Let us suppose that the machine, shown at fig. 1, is before us; place on the table a piece of timber, having previously marked off the length of the tenon. (See timber, in red, fig. 1.) This point where the tenon is to end must be set with the outer edge of the gauge D; adjust and screw up the clamp C, bring down against the top edge of the timber the drop E, taking care to have the carriage drawn back far enough for the said piece of timber to be fed up to the cutters the desired amount; now adjust the knives to the proper position on the sliding frame, and also to the desired position apart; according to the width of the timber I must regulate the spring; to tighten it is for wide timber, the distance between the cutters and the table being increased or lengthened; and *vice versa* for narrow timber or stuff. The tension of the spring is altered by moving the pin in the link W.

Now we set the machine in motion by the application of the foot to the treadle U, by which the said timber is fed up to the cutters, and the tenon formed on both sides at the same time, as will be fully understood without further description. If the material worked should be soft and it is desired to run faster, it may be done by regulating the little hook Z, which will make the pawl move the ratchet-wheel backward two teeth instead of one, as usual.

This invention, as an improvement upon my former patent of November 24, 1868, consists in the hereinbefore-described arrangement of the various parts of the feeding devices, consisting of pawl J, ratchet-wheel K, pinion L, rack M, regulating-hook Z.

Another feature is the arrangement and combination of the carriage B, gauge D, and drop E.

And still further an important feature is in making a plane face surface on the end of the cutters facing the wood; but no cutting-edge to smooth the tenon, as on my knives in my former patent above mentioned. This plane abrupt ending of the knives provides no cutting surface to cut the wood lengthwise of the grain of the wood, leaves that part to be separated by pressure, thus securing a rough-face surface, $h$, on the tenon, a very desirable quality to aid in fastening or securing the tenon in its mortise.

Having now described my invention, I will proceed to set forth what I claim and desire to secure by Letters Patent.

I claim—

1. The combination and arrangement of the pawl and pawl-arm J, ratchet-wheel K, pinion L, rack M, regulating-hook Z, and wiper P, for the purpose hereinbefore described.

2. The arrangement of the carriage B, drop E, and gauge D, as and for the purpose hereinbefore described.

In testimony whereof I have signed my name to this specification in the presence of two subscribing witnesses.

WILLIAM GILMORE.

Witnesses:
 HENRY M. ROGERS,
 C. ARTHUR TOTTEN.